(12) United States Patent
Burkhardt et al.

(10) Patent No.: US 6,836,735 B2
(45) Date of Patent: Dec. 28, 2004

(54) METHOD AND SYSTEM FOR INJECTING VIRTUAL FLAW SIGNALS INTO A NONDESTRUCTIVE TEST SYSTEM

(75) Inventors: Gary L. Burkhardt, Adkins, TX (US); Jay L. Fisher, San Antonio, TX (US); Ronald H. Peterson, Helotes, TX (US)

(73) Assignee: Southwest Research Institute, San Antonio, TX (US)

(*) Notice: Subject to any disclaimer, the term of this patent is extended or adjusted under 35 U.S.C. 154(b) by 143 days.

(21) Appl. No.: 10/605,091

(22) Filed: Sep. 8, 2003

(65) Prior Publication Data

US 2004/0117134 A1 Jun. 17, 2004

Related U.S. Application Data

(60) Provisional application No. 60/319,543, filed on Sep. 11, 2002.

(51) Int. Cl.[7] .................................................. G06F 17/40
(52) U.S. Cl. ............................................. 702/35; 703/14
(58) Field of Search ................................ 702/35, 5, 16, 702/33, 34, 36, 57–59, 150–153, 167, 168, 182, 183; 703/1, 6, 7, 14, 22

(56) References Cited

U.S. PATENT DOCUMENTS

| | | | | |
|---|---|---|---|---|
| 3,910,124 A | * | 10/1975 | Halsey | 73/601 |
| 5,764,721 A | * | 6/1998 | Light et al. | 378/4 |
| 5,936,725 A | * | 8/1999 | Pike et al. | 356/237.1 |
| 6,473,794 B1 | * | 10/2002 | Guheen et al. | 709/223 |

* cited by examiner

Primary Examiner—Marc S. Hoff
Assistant Examiner—Edward Raymond
(74) Attorney, Agent, or Firm—Taylor Russell & Russell, PC (57) ABSTRACT

The invention provides an electronic circuit means for injecting virtual flaw signals into the signal path between a NDT test instrument and an associated probe. This enables a system that is capable of generating virtual flaw signals to present virtual flaws to an NDT inspector while enabling the test probe to present actual flaws to the NDT inspector. An eddy current test (ECT) embodiment of the invention comprises a means for deriving a reference signal from an ECT instrument excitation signal, a means for modulating the gain and phase of the reference signal by commands from a control computer, and a means for summing the modulated signal with the ECT probe output signal for transmission to the ECT instrument.

36 Claims, 6 Drawing Sheets

METHOD AND SYSTEM FOR INJECTING VIRTUAL FLAW SIGNALS INTO A NONDESTRUCTIVE TEST SYSTEM

CROSS REFERENCE TO RELATED APPLICATIONS

This application claims benefit of U.S. Provisional Application No. 60/319,543, filed on Sep. 11, 2002.

BACKGROUND OF INVENTION

The invention relates generally to nondestructive methods for determining the integrity of components and structures. More particularly, the invention is a method and circuit used in a system for nondestructive test method qualification and probability of detection determination, for establishing and maintaining nondestructive testing proficiency of inspectors, for periodically presenting flaw signals to inspectors during routine inspections, and for ensuring sufficient scan coverage for detection of material defects in a test piece. The invention enables the injection of a virtual flaw signal into an NDT system that makes use of eddy current testing (ECT) to detect the presence of flaws in components and structures.

Nondestructive testing (NOT) is used in many industries to detect the presence of flaws so that the integrity of components and structures may be determined. NDT involves using various test methods, such as eddy current and ultrasonics. Applications include military and civilian aircraft, fossil and nuclear electrical power generation equipment, petrochemical plants, etc. There are several needs within the NDT environment that, if satisfied, would significantly reduce inspection costs and improve the reliability and quality of inspections.

NDT method qualification and probability of detection (POD) determination is one area of need. Demonstration of the capability and reliability of new NDT techniques must often be done in a short period of time and at minimal cost. The present approach is to perform a POD study. These studies involve producing many test specimens with realistic flaws, training multiple NDT technicians, and conducting blind tests. Fabrication of the flawed specimens is very expensive and time consuming. As a result, a POD study is usually performed only for the most critical applications. A system and method to reduce costs and time required to implement POD studies is needed.

NDT inspectors must be trained to ensure proficiency in new and existing NDT procedures. Training is also required periodically in order to maintain proficiency of the inspectors. Although specimens with realistic flaws are needed for training, they are often not available. Video-based training courses are available, but they do not provide "hands-on" experience with real flaws. Therefore, better training methods are another area of need.

Monitoring existing inspections when flaws are infrequent presents another area of need. In some routine inspections, flaws are encountered very infrequently, sometimes less than once per year. Inspectors may become conditioned to not expecting flaws, resulting in a loss of proficiency. A method is needed to periodically present simulated flaws to inspectors during routine inspections.

Ensuring that a thorough scan is conducted over an entire test piece in another area of need. Some inspections are performed by hand scanning, and the scanning coverage of the appropriate area is dependent on the skill and attention of the operator. A method is needed to monitor scan position so that proper coverage is obtained.

The purpose of the present invention is to enable virtual flaw signal injection into a NDT system that relies on eddy current testing (ECT) to inspect a test piece. This enables reliability testing and training to be performed without the need for actual flaws. The method and circuit disclosed herein is used with a simulator to inject virtual flaw signals into a probe input terminal of ECT instrumentation. The signal injection is performed without interfering with normal ECT instrument probe operation or with signals from the probe. The invention is able to inject virtual flaw signals while allowing the ECT instrumentation to be responsive to existing flaws and geometry features of a work piece, as well as variations in the probe's distance from or orientation to the work piece.

SUMMARY OF INVENTION

The present invention provides for a method and circuit that enables ECT instrumentation to satisfy the needs for reducing costs and time required to implement POD studies, providing improved realistic training methods, presenting simulated flaws to inspectors during routine inspections, and for monitoring scan position to ensure proper coverage of test pieces. This invention enables a simulation system to perform the functions of an NDT inspection simulator analogous to flight simulators used to train aircraft pilots. The operations of the NDT simulator using the present invention are transparent to the inspector using the system when realistic, virtual flaw signals are presented at preprogrammed locations on the actual test piece. The virtual flaw signals may be premeasured or generated from a model. This method of presenting virtual flaws provides the equivalent of real flaws to an inspector without the requirement for having actual flaws in a test piece. The inspector may use the same probes and instrumentation of a conventional ECT instrument that are normally used in the inspection process. The injection circuit comprising the present invention may be connected between the probe and ECT instrument so that flaw responses will be injected into the instrument, and the operator may view a response on the actual ECT instrument display. The probe and instrument may remain "live", so that the interaction between the probe and the test piece remain active as well. The simulator may track the probe position so that responses from flaws can be injected at a selected location on the test piece.

The present invention enables POD tests to be accomplished without the need for manufacturing a large number of actually flawed test pieces. A training mode may be implemented in which the inspector receives instructions from the system and can practice with the equivalent of actual flawed test pieces. The system may be used with routine inspections to inject virtual flaw signals to keep inspectors alert, and may be used to monitor probe position in manual test scans to ensure proper coverage.

An embodiment of the present invention is a method for injecting virtual flaw signals into a nondestructive test system, comprising the steps for moving a test probe over a test piece by an inspector, providing an excitation signal from the nondestructive test system to the test probe and a virtual flaw injection circuit, determining virtual flaw parameter signals from test probe position signals and a stored virtual flaw map for the test piece, sending the virtual flaw parameter signals and an output signal from the test probe to the virtual flaw injection circuit, processing the excitation signal and the test probe output signal using the virtual flaw parameter signals for generating a virtual flaw response signal by the virtual flaw injection circuit, transmitting the virtual flaw response signal to a test probe input of the nondestructive test system, and displaying actual and virtual flaws to the inspector from the nondestructive test system. The step for determining virtual flaw parameter signals may further comprise the steps for reading test probe position signals for indicating test probe positions relative to a test piece, reading test probe liftoff measurement signals for indicating test probe liftoff from the test piece, reading a virtual flaw map for the test piece stored in a memory for determining uncorrected virtual flaw parameter signals based on the test probe position signals, and applying a liftoff correction based on the lest probe liftoff measurement signals to the uncorrected virtual flaw parameter signals for determining corrected virtual flaw parameter signals. The step for processing may further comprise the steps for modulating an amplitude of the excitation signal by the virtual flaw parameter signals, shifting a phase of the amplitude modulated excitation signal by the virtual flaw parameter signals, and summing the amplitude modulated and phase shifted excitation signal with the test probe output signal for generating a virtual flaw response signal by the virtual flaw injection circuit. The step for modulating an amplitude may comprise modulating an amplitude of the excitation signal by virtual flaw gain parameter signals and the step for shifting a phase may comprise shifting the phase of the excitation signal by virtual flaw phase shift parameter signals. The step for modulating the amplitude of the excitation signal may comprise the steps for connecting the excitation signal to the input of a variable gain amplifier, controlling the gain of the variable gain amplifier by the virtual flaw gain parameter signal, and providing an amplitude modulated excitation signal at the output of the variable gain amplifier. The step for shifting the phase of the amplitude modulated excitation signal may comprise the steps for connecting the amplitude modulated excitation signal to the input of a variable phase shifter, controlling the phase shift of the variable phase shifter by the virtual flaw phase shift parameter signal, and providing an amplitude modulated and phase shifted excitation signal at the output of the variable phase shifter. The may further comprise the step for basing the nondestructive test system on eddy current technology.

Another embodiment of the present invention is a method for injecting virtual flaw signals into a nondestructive test system, comprising the steps for connecting a flaw signal injection circuit between a nondestructive test instrument and a nondestructive test probe, receiving an excitation signal, a test probe output signal and virtual flaw parameter signals by the flaw signal injection circuit while moving a test probe over a test piece by an inspector, modulating an amplitude and shifting a phase of the excitation signal under control of the virtual flaw parameter signals in the flaw signal injection circuit, summing the amplitude modulated and phase shifted excitation signal with the test probe output signal for generating a virtual flaw response signal by the virtual flaw injection circuit, and sending the virtual flaw response signal from the virtual flaw injection circuit to a test probe input of the nondestructive test instrument for display of virtual and actual flaws to an inspector. The step for receiving virtual flaw parameter signals may further comprise receiving virtual flaw parameters signals determined by the steps for reading test probe position signals for indicating test probe positions relative to a test piece, reading test probe liftoff measurement signals for indicating test probe liftoff from the test piece, reading a virtual flaw map for the test piece stored in a memory for determining uncorrected virtual flaw parameter signals based on the test probe position signals, and applying liftoff correction based on the test probe liftoff measurement signals to the uncorrected virtual flaw parameter signals for determining corrected virtual flaw parameter signals. The step for modulating an amplitude may comprise modulating an amplitude of the excitation signal by virtual flaw gain parameter signals and the step for shifting a phase may comprise shifting the phase of the excitation signal by virtual flaw phase shift parameter signals. The step for modulating the amplitude of the excitation signal may comprise the steps for connecting the excitation signal to the input of a variable gain amplifier, controlling the gain of the variable gain amplifier by the virtual flaw gain parameter signal, and providing an amplitude modulated excitation signal at the output of the variable gain amplifier. The step for modulating the amplitude of the excitation signal may comprise the steps for connecting the excitation signal to a high terminal of an input digital potentiometer, connecting a wiper terminal of the input digital potentiometer to a noninverting input of a differential amplifier, connecting a wiper terminal of a feedback digital potentiometer to an inverting input of the differential amplifier, connecting an output of the differential amplifier to a high terminal of the feedback digital potentiometer, connecting a low terminal of the input digital potentiometer and the feedback digital potentiometer to ground reference potential, connecting the virtual flaw gain parameter signal to a control input of the input digital potentiometer and a control input of the feedback digital potentiometer, and providing an amplitude modulated excitation signal at the output of the differential amplifier. The step for shifting the phase of the amplitude modulated excitation signal may comprise the steps for connecting the amplitude modulated excitation signal to the input of a variable phase shifter, controlling the phase shift of the variable phase shifter by the virtual flaw phase shift parameter signal, and providing an amplitude modulated and phase shifted excitation signal at the output of the variable phase shifter. The step for shifting the phase of the amplitude modulated excitation signal may comprise the steps for connecting three identical phase shift circuits in a cascade configuration, including the steps for connecting an input of a first phase shift circuit to the amplitude modulated excitation signal, connecting an output of the first phase shift circuit to an input of a second phase shift circuit, connecting an output of the second phase shift circuit to an input of a third phase shift circuit, providing an output of the third phase shift circuit as the amplitude modulated and phase shifted excitation signal, and shifting the phase of a signal at an input of each phase shift circuit, including the steps for connecting the input signal of each phase shift circuit to a first terminal of an input resistor and a first terminal of an input capacitor, connecting a second terminal of the input capacitor to a noninverting input of a differential amplifier and a high terminal of a digital potentiometer, connecting a wiper terminal and a low terminal of the digital potentiometer to a ground reference potential, connecting a second terminal of the input resistor to a first terminal of a feedback resistor and an inverting input of the differential amplifier, connecting a second terminal of the feedback resistor to an output of the differential amplifier, the output of the differential amplifier providing an output of the phase shift circuit, and connecting the virtual flaw phase shift parameter signal to a control input of the input digital potentiometer for varying a phase shift of the phase shift circuit. The step for shifting the phase of a signal at an input of each phase shift circuit may comprise shifting of the input signal between 0 and 120 degrees as represented by the phase shift circuit output signal. The method may further comprise the step for deriving the virtual flaw map from the group consisting of a model and premeasured flaws. The nondestructive test instrument and a nondestructive test probe may be based on eddy current technology. The method may further comprise selecting a test probe from the group consisting of a single element probe, a dual element probe and a triple element probe.

Yet another embodiment of the present invention is a system for injecting virtual flaw signals into a nondestructive test system, comprising means for moving a test probe over a test piece by an inspector, means for providing an excitation signal from the nondestructive test system to the test probe and a virtual flaw injection circuit, means for determining virtual flaw parameter signals from test probe position signals and a stored virtual flaw map for the test piece, means for sending the virtual flaw parameter signals and an output signal from the test probe to the virtual flaw injection circuit, means for processing the excitation signal and the test probe output signal using the virtual flaw parameter signals for generating a virtual flaw response signal by the virtual flaw injection circuit, means for transmitting the virtual flaw response signal to a test probe input of the nondestructive test system, and means for displaying actual and virtual flaws to the inspector from the nondestructive test system. The means for determining virtual flaw parameter signals may further comprise means for reading test probe position signals for indicating test probe positions relative to a test piece, means for reading test probe liftoff measurement signals for indicating test probe liftoff from the test piece, means for reading a virtual flaw map for the test piece stored in a memory for determining uncorrected virtual flaw parameter signals based on the test probe position signals, and means for applying a liftoff correction based on the test probe liftoff measurement signals to the uncorrected virtual flaw parameter signals for determining corrected virtual flaw parameter signals. The means for processing may further comprise means for modulating an amplitude of the excitation signal by the virtual flaw parameter signals, means for shifting a phase of the amplitude modulated excitation signal by the virtual flaw parameter signals, and means for summing the amplitude modulated and phase shifted excitation signal with the test probe output signal for generating a virtual flaw response signal by the virtual flaw injection circuit. The means for modulating an amplitude may comprise means for modulating an amplitude of the excitation signal by virtual flaw gain parameter signals and the means for shifting a phase may comprise means for shifting the phase of the excitation signal by virtual flaw phase shift parameter signals. The means for modulating the amplitude of the excitation signal may comprise means for connecting the excitation signal to the input of a variable gain amplifier, means for controlling the gain of the variable gain amplifier by the virtual flaw gain parameter signal, and means for providing an amplitude modulated excitation signal at the output of the variable gain amplifier. The means for shifting the phase of the amplitude modulated excitation signal may comprise the steps for the amplitude modulated excitation signal connected to the input of a variable phase shifter, the phase shift of the variable phase shifter controlled by the virtual flaw phase shift parameter signal, and an amplitude modulated and phase shifted excitation signal provided at the output of the variable phase shifter. The system may further comprise the nondestructive test system based on eddy current technology.

A further embodiment of the present invention includes a system for injecting virtual flaw signals into a nondestructive test system, comprising a flaw signal injection circuit connected between a nondestructive test instrument and a nondestructive test probe, an excitation signal, a test probe output signal and virtual flaw parameter signals received by the flaw signal injection circuit while moving a test probe over a test piece by an operator, an amplitude and a phase shift of the excitation signal being controlled by the virtual flaw parameter signals in the flaw signal injection circuit, the amplitude modulated and phase shifted excitation signal being summed with the test probe output signal for generating a virtual flaw response signal by the virtual flaw injection circuit, and the virtual flaw response signal being sent from the virtual flaw injection circuit to a test probe input of the nondestructive test instrument for display of virtual and actual flaws to an inspector. The virtual flaw parameter signals may further comprise virtual flaw parameters signals determined by test probe position signals for indicating test probe positions relative to a test piece, test probe liftoff measurement signals for indicating test probe liftoff from the test piece, a virtual flaw map for the test piece stored in a memory for determining uncorrected virtual flaw parameter signals based on the test probe position signals, and liftoff correction based on the test probe liftoff measurement signals to the uncorrected virtual flaw parameter signals for determining corrected virtual flaw parameter signals. The means for modulating an amplitude may comprise means for modulating an amplitude of the excitation signal by virtual flaw gain parameter signals and the means for shifting a phase may comprise means for shifting the phase of the excitation signal by virtual flaw phase shift parameter signals. The means for modulating the amplitude of the excitation signal may comprise means for connecting the excitation signal to the input of a variable gain amplifier, means for controlling the gain of the variable gain amplifier by the virtual flaw gain parameter signal, and means for providing an amplitude modulated excitation signal at the output of the variable gain amplifier. The means for modulating the amplitude of the excitation signal may comprise the excitation signal connected to a high terminal of an input digital potentiometer, a wiper terminal of the input digital potentiometer connected to a noninverting input of a differential amplifier, a wiper terminal of a feedback digital potentiometer connected to an inverting input of the differential amplifier, an output of the differential amplifier connected to a high terminal of the feedback digital potentiometer, a low terminal of the input digital potentiometer and the feedback digital potentiometer connected to ground reference potential, the virtual flaw gain parameter signal connected to a control input of the input digital potentiometer and a control input of the feedback digital potentiometer, and an amplitude modulated excitation signal provided at the output of the differential amplifier. The means for shifting the phase of the amplitude modulated excitation signal may comprise the steps for the amplitude modulated excitation signal connected to the input of a variable phase shifter, the phase shift of the variable phase shifter controlled by the virtual flaw phase shift parameter signal, and an amplitude modulated and phase shifted excitation signal provided at the output of the variable phase shifter. The means for shifting the phase of the amplitude modulated excitation signal may comprise three identical phase shift circuits connected in a cascade configuration, including an input of a first phase shift circuit connected to the amplitude modulated excitation signal, an output of the first phase shift circuit connected to an input of a second phase shift circuit, an output of the second phase shift circuit connected to an input of a third phase shift circuit, an output of the third phase shift circuit provided as the amplitude modulated and phase shifted excitation signal, and each phase shift circuit including the input signal of each phase shift circuit connected to a first terminal of an input resistor and a first terminal of an input capacitor, a second terminal of the input capacitor connected to a noninverting input of a differential amplifier and a high terminal of a digital potentiometer, a wiper terminal and a low terminal of the digital potentiometer connected to a ground reference potential, a second terminal of the input resistor connected to a first terminal of a feedback resistor and an inverting input of the differential amplifier, a second terminal of the feedback resistor connected to an output of the differential amplifier, the output of the differential amplifier providing an output of the phase shift circuit, and the virtual flaw phase shift parameter signal connected to a control input of the input digital potentiometer for varying a phase shift of the phase shift circuit. The system wherein each phase shift circuit may shift the input signal between 0 and 120 degrees as represented by the phase shift circuit output signal. The system may further comprise the virtual flaw map derived from the group consisting of a model and premeasured flaws. The nondestructive test instrument and a nondestructive test probe may be based on eddy current technology. The system may further comprise a test probe selected from the group consisting of a single element probe, a dual element probe and a triple element probe.

BRIEF DESCRIPTION OF DRAWINGS

These and other features, aspects and advantages of the present invention will become better understood with regard to the following description, appended claims, and accompanying drawings wherein:

DETAILED DESCRIPTION

Figure 1:
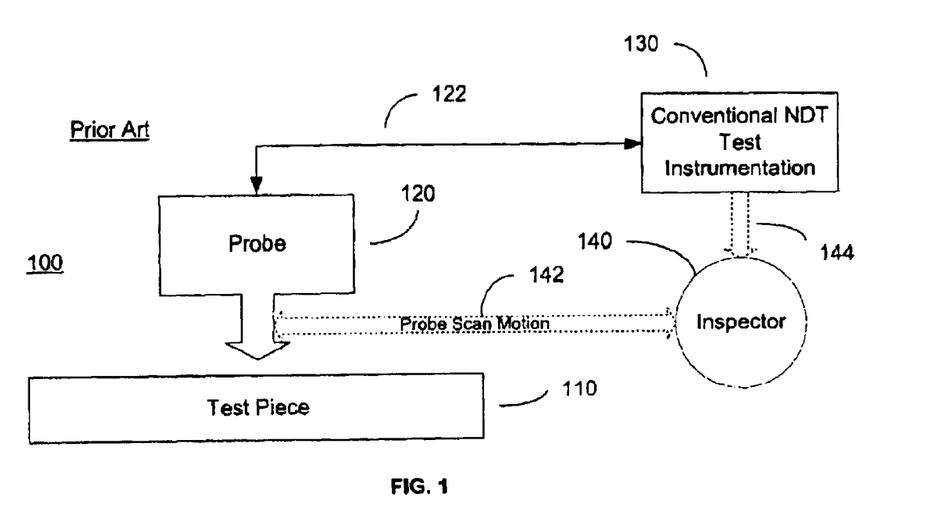
FIG. 1 shows a conventional instrumentation block diagram.

Turning now to FIG. 1, FIG. 1 shows a conventional instrumentation block diagram 100 used for NDT purposes that is typical of current technology. A probe 120 is caused to scan 142 a test piece 110 by an inspector 140. The probe 120 may be based on various technologies, such as eddy current (ECT) or ultrasonic technologies. The probe 120 receives an excitation signal from the associated conventional test instrumentation 130 and transmits an output signal to the associated conventional test instrumentation 130 over a cable connection 122. The test instrumentation 130 provides a display to the inspector 140 for viewing the test results 144.

This prior art configuration 100 does not allow for instructional training, monitoring inspections when the incidences of flaws are infrequent, or for ensuring proper scan coverage.

Figure 2:
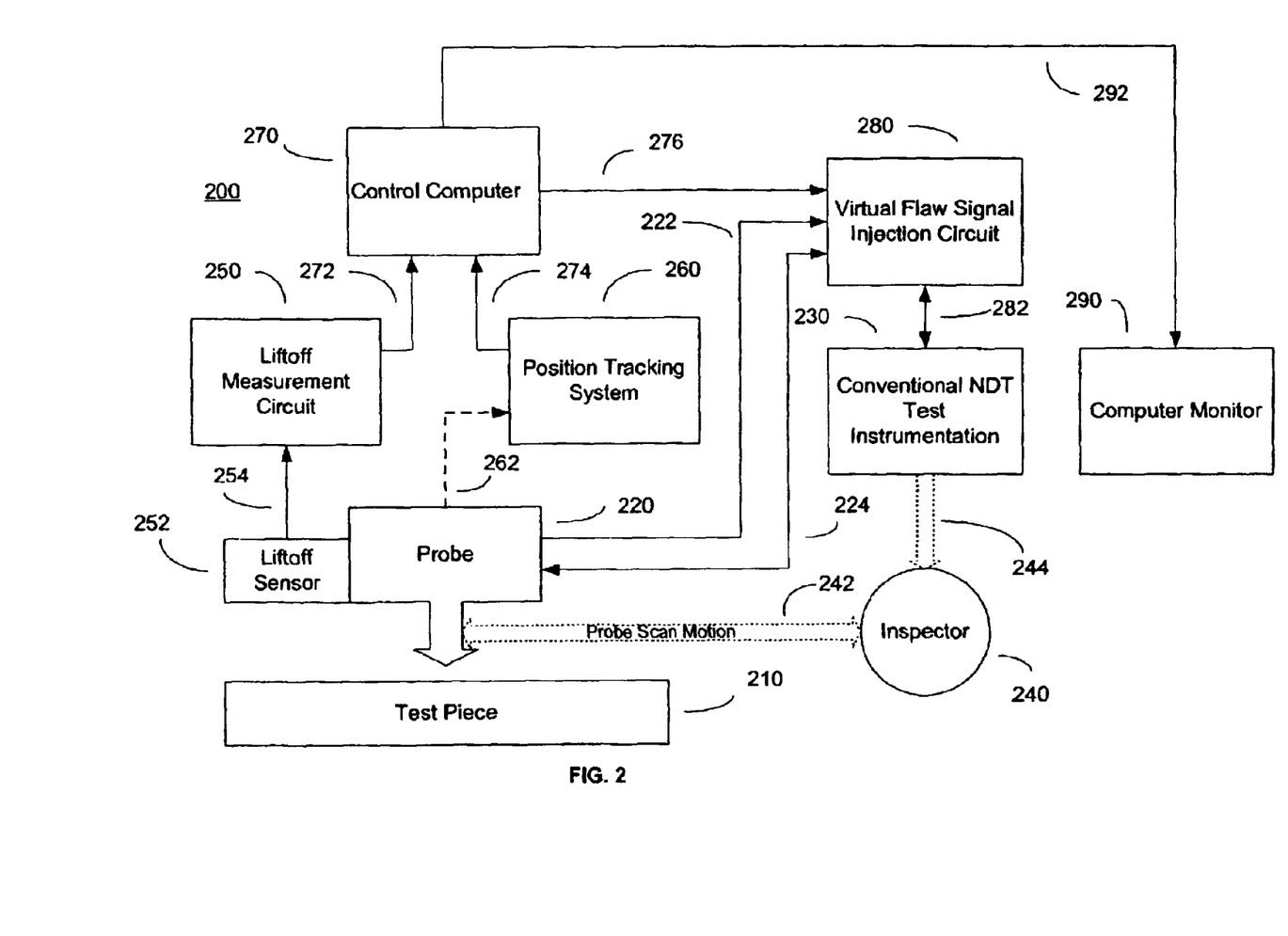
FIG. 2 shows a system block diagram of an embodiment of the present invention.

Turning to FIG. 2, FIG. 2 shows a system block diagram 200 that includes an embodiment of the present invention. A probe 220 is caused to scan 242 a test piece 210 by an inspector 240. The probe 220 may be based on various technologies, including but not limited to eddy current and ultrasonic technologies. The probe 220 is connected to a virtual flaw signal injection circuit 280 over a cable or cables 222, 224. The virtual flaw signal injection circuit 280 is connected to conventional NDT test instrumentation 230 over a connection 282. An excitation signal 224 is transmitted to the probe 220 from the virtual flaw signal injection circuit 280 over a cable connection 224. The probe 220 transmits an output signal to the virtual flaw signal injection circuit 280 over an output cable connection 222. The virtual flaw injection circuit 280 represents embodiments of the present invention. The test instrumentation 230 provides a display to the inspector 240 for viewing the test results 244, which may include actual and simulated flaws. A liftoff sensor 252 is affixed to the probe 220 to measure the proximity of the probe 220 to the work piece 210. The liftoff sensor 252 has a connection 254 to a liftoff measurement circuit 250, which conditions and converts a liftoff sensor signal 254 into a computer readable format. The liftoff measurement circuit 250 has a connection 272 for sending the computer readable liftoff measurement signal 272 to a control computer 270. The liftoff sensor 252 may be based on various technologies, including but not limited to eddy current, capacitive and optical technologies. Also associated with the probe 220 is a probe position tracking system 260 that includes a fixed positional arrangement 262 with the probe position. The position tracking system 260 transmits a computer readable probe position signal 274 to the control computer 270. The position tracking system 260 may be any one of several commercially available systems that are suitable for this application. The control computer 270 uses the liftoff signal, the position tracking signal, and a stored table relating virtual flaws to probe position in order to compute a virtual flaw signal based on probe position. When the probe 220 is in a position relating to a virtual flaw position, the control computer 270 transmits the virtual flaw signal 276 to a virtual flaw signal injection circuit 280. The virtual flaw signal injection circuit 280 combines the virtual flaw signal 276 from the control computer 270 with an actual probe signal 222 from the probe 220 and sends the combined signal 282 to the conventional ECT test instrumentation 230, where the results may be viewed 244 by an inspector 240. The probe 220 may comprise various configurations, including but not limited to the following: a single element probe for transmitting excitation signals and receiving test signals; a dual element probe for transmitting excitation signals and receiving test signals differentially; a dual element probe for transmitting excitation signals on one element and receiving test signals on a second element; and a triple element probe for transmitting excitation signals on one element and receiving test signals differentially on two other elements. The system 200 shown in FIG. 2 allows for instructional training of an inspector 240 with a conventional computer monitor 290 having a connection 292 to the control computer 270. The system 200 also provides for monitoring inspections when the incidences of flaws are infrequent, and for ensuring proper scan coverage of the test piece 210.

To use the system shown in FIG. 2, the inspector 240 moves the probe 220 over the test piece 210, as in a conventional inspection procedure. The probe 220 is mechanically coupled to a position tracking system 260 that reports probe coordinates to the control computer 270. The control computer 270 is programmed with the dimensions of the test piece 210, and a positional map of virtual flaws signals to appear on the test piece 210. The virtual flaw responses are developed from a model of the NDT instrumentation response or from premeasured signals. When the probe 220 reaches designated positions, the control computer 270 commands the signal injection circuit 280 to create a flaw response signal on the probe input line 282 to the NDT test instrumentation 230. The inspector 240 may then view the flaw response 244 on the instrumentation display means. Since the NDT test instrumentation 230 may be sensitive to liftoff of the probe 220, a liftoff sensor 252 may be affixed to the probe 220 to monitor probe liftoff. The control computer 270 may use the liftoff signal 274 to provide a liftoff corrected response to the inspector 240.

Figure 3:
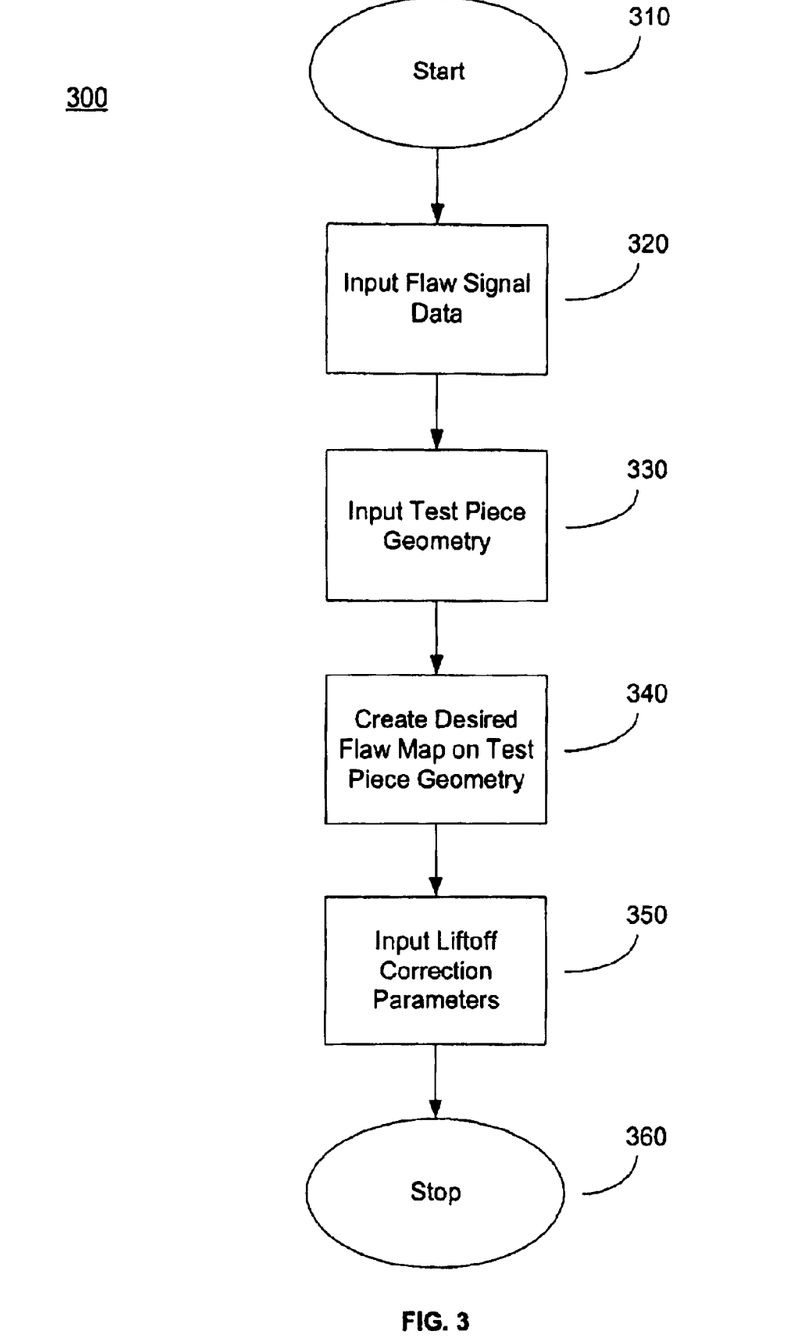
FIG. 3 depicts a flow diagram of a setup mode for the system depicted in FIG. 1.

Turning now to FIG. 3, FIG. 3 depicts a computer flow diagram of a setup mode 300 for the system depicted in FIG. 1. This initialization process 300 is started 310 and comprises inputting flaw signal data 320, inputting a test piece geometry 330, creating a desired flaw map on the test piece geometry 340, and inputting liftoff correction parameters 350. Once this process is complete, the system may start processing data in a run mode.

Figure 4:
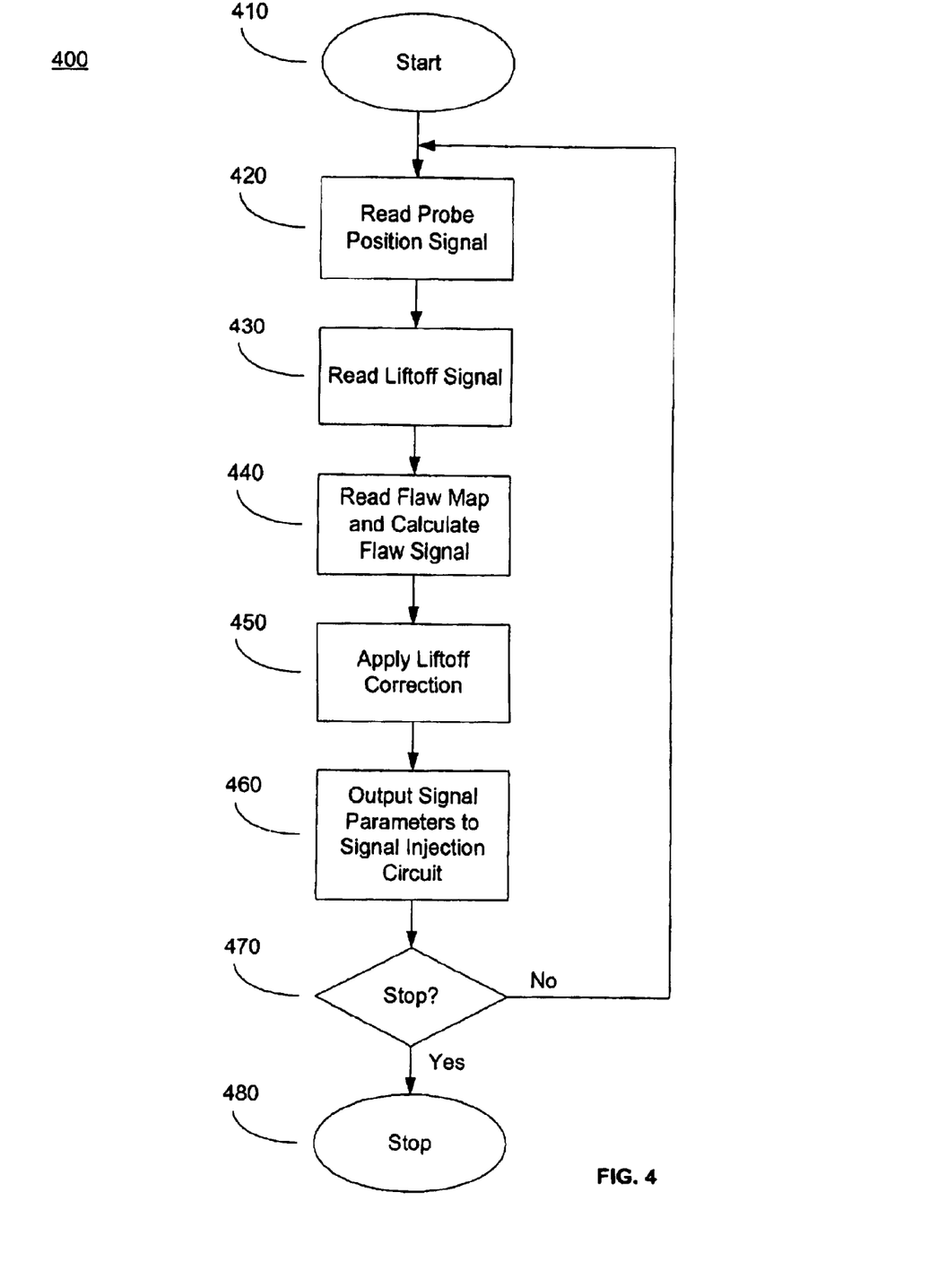
FIG. 4 depicts a flow diagram of a run mode for the system depicted in FIG. 1.

Turning to FIG. 4, FIG. 4 depicts a computer flow diagram of a run mode 400 for the system depicted in FIG. 1. When a run mode 400 is started 410, the run mode 400 comprises reading a probe position signal 420, reading a liftoff signal 430, and reading a flaw map and calculating flaw signals 440. A liftoff correction is applied to the calculated flaw signal 450, and the signal parameters are output to a signal injection circuit 460. The injection flaw circuit represents embodiments of the present invention. If the run mode is not stopped 470, it will continue to cycle through the run process 400.

Figure 5:
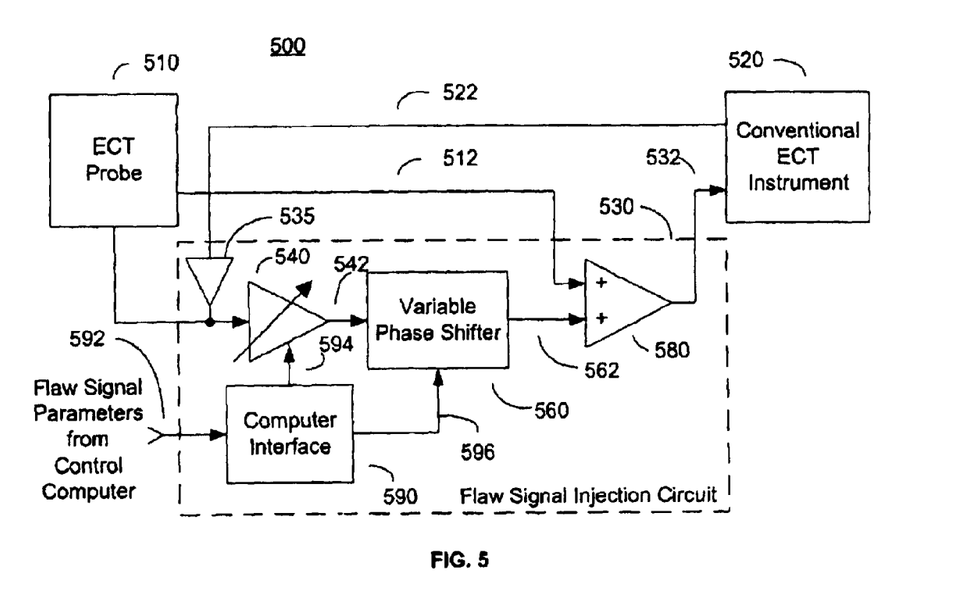
FIG. 5 shows a block diagram of a flaw signal injection circuit in relation to a conventional ECT instrument and an ECT probe.

Turning now to FIG. 5, FIG. 5 shows a block diagram 500 of a flaw signal injection circuit 530 in relation to a conventional ECT instrument 520 and an ECT probe 510. The flaw signal injection circuit 530 is connected between the conventional ECT instrument 520 and an ECT probe 510. The circuit 530 derives a reference signal from the probe drive signal 522 produced by the ECT instrument 520. This drive signal 522 is connected through a buffer amplifier 535 to an input of a variable gain amplifier 540, controlled from a control computer via a computer interface 590. An output 542 of the variable gain amplifier 540 is connected to an input of a variable phase shifter 560, also controlled from a control computer via the computer interface 590. The gain and phase of the drive signal 522 are controlled by the control computer in such a way as to obtain the same response that would result from the probe passing over a flaw in a work piece. This gain and phase shifted signal at the output 562 of the phase shifter 560 is summed in a summing amplifier 580 with the sensor output from the ECT probe 510 and sent to a probe input 532 of the ECT instrument 520. The variable gain amplifier 540 and variable phase shifter 560 are controlled by parameters sent from the control computer. The input 592 to the computer interface 590 from the control computer may be, but not limited to a serial interface, a parallel interface, an Ethernet interface, and a USB interface. The function of the flaw signal injection circuit 530 is such that the ECT instrument 520 will respond to either virtual flaw signals generated by the flaw signal injection circuit 530 or flaw signals from the ECT probe 510 passing over an actual flaw in a test piece. As noted above, the ECT probe 510 may comprise various configurations, including but not limited to the following: a single element probe for transmitting excitation signals and receiving test signals; a dual element probe for transmitting excitation signals on one element and receiving test signals on a second element; and a triple element probe for transmitting excitation signals on one element and receiving test signals differentially on two other elements.

Figure 6:
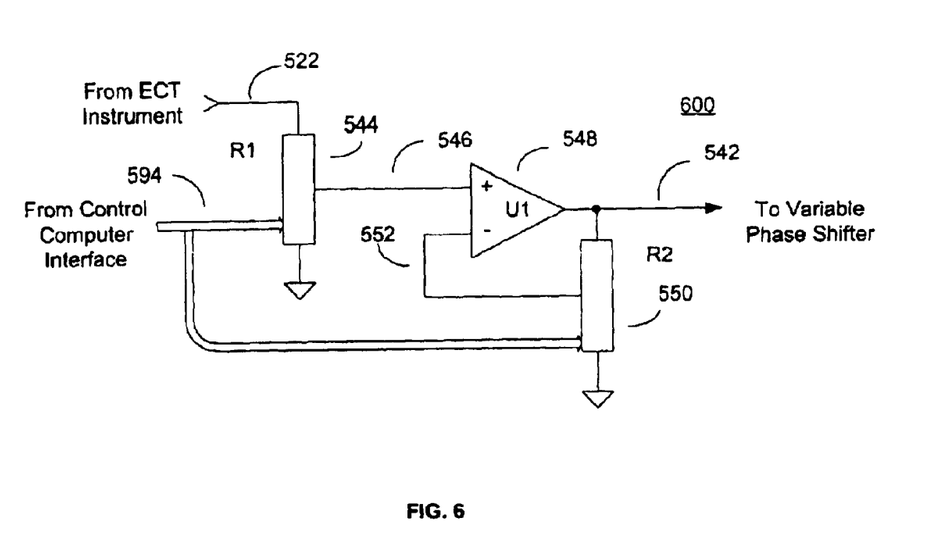
FIG. 6 depicts a schematic diagram of an embodiment of a variable gain amplifier that is controlled from a control computer.

Turning to FIG. 6, FIG. 6 depicts a schematic diagram of an embodiment 600 of a variable gain amplifier (540 in FIG. 5) within a flaw signal injection circuit that is controlled from a control computer. An excitation signal 522 from an ECT instrument connects to a high terminal of an input digital potentiometer 544. The digital potentiometers used in the flaw signal injection circuit are commercially available integrated circuits. A signal at the wiper terminal 546 of the input digital potentiometer 544 is connected to a non-inverting input of an operational amplifier 548. A low terminal of the input digital potentiometer 544 is connected to a ground potential 554. The position of the wiper of the input digital potentiometer 544 is controlled by a signal 594 from the control computer interface. The function of the input digital potentiometer 544 is to scale the input voltage to the flaw signal injection circuit. An output signal 542 of the operational amplifier 548 connects to a variable phase shifter and to a high terminal of a feedback digital potentiometer 550. A low terminal of the feedback digital potentiometer 550 is connected to a ground potential 554. A signal at the wiper terminal 552 of the feedback digital potentiometer 550 is connected to an inverting input of the operational amplifier 548. The position of the wiper of the feedback digital potentiometer 550 is controlled by a signal 594 from the control computer interface (590 in FIG. 5). The function of the feedback digital potentiometer 550 is to adjust the gain of the variable gain amplifier, and therefore the magnitude of the signal 542 to the variable phase shifter and the gain of the flaw signal injection circuit.

Figure 7:
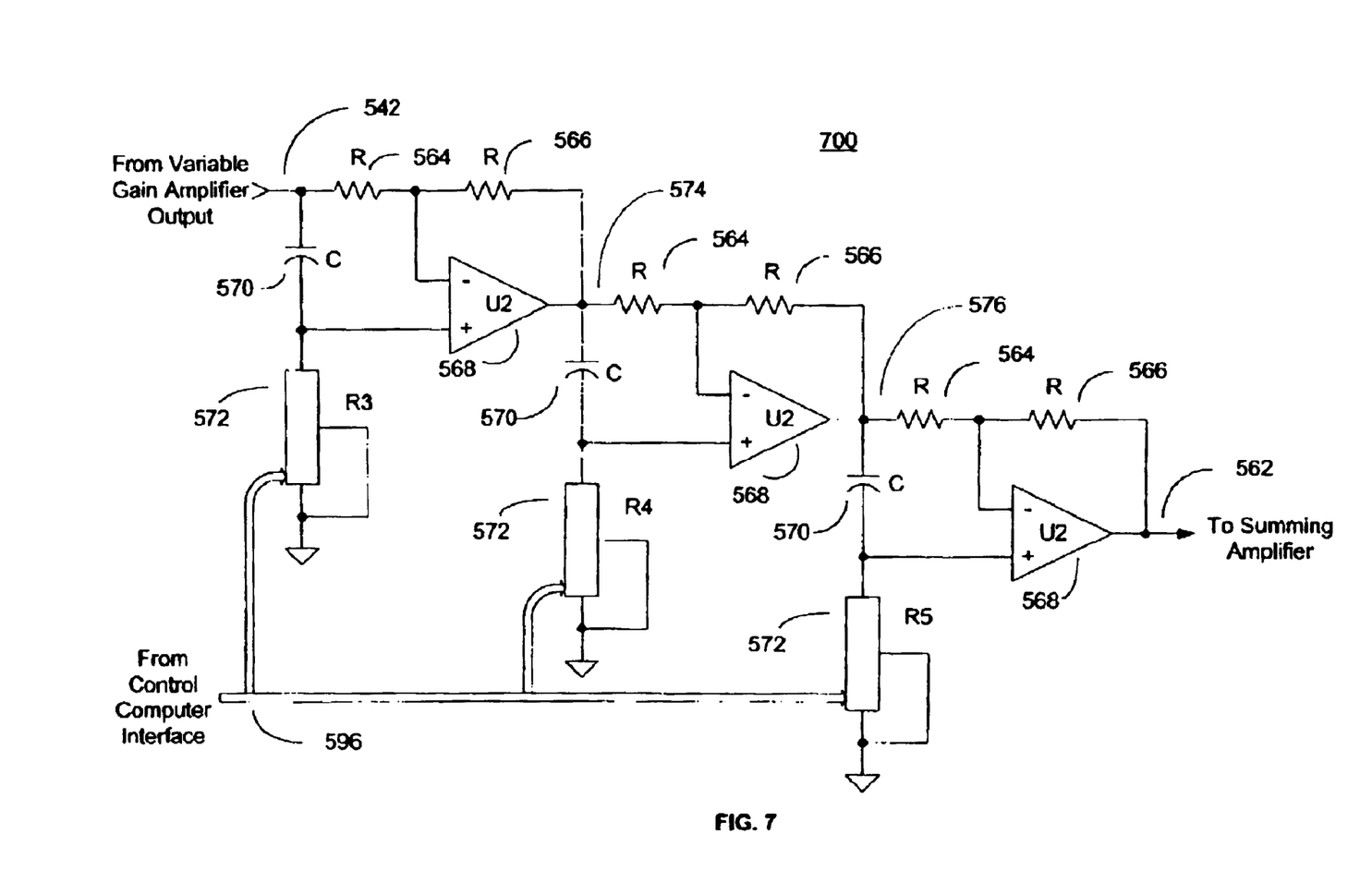
FIG. 7 depicts a schematic diagram of an embodiment of a variable phase shifter that is controlled from a control computer.

FIG. 7 depicts a schematic diagram of an embodiment 700 of a variable phase shifter (560 in FIG. 5) that is controlled from a control computer. The variable phase shifter comprises three identical all-pass unity gain variable phase shift circuits. Each identical phase shift circuit is capable of varying the phase of an input signal between 0° and 120°, so by cascading the three identical phase shift circuits shown in FIG. 7, a total of 360° may be obtained. Each identical phase shift circuit comprises an operational amplifier 568, a feedback resistor connected between an output of the operational amplifier 568 and an inverting input of the operational amplifier 568. Each phase shift circuit further comprises an input resistor 564 connected between an input signal and the inverting input of the operational amplifier 568, an input capacitor 570 connected between the input signal and a non-inverting input of the operational amplifier 568, and a high terminal of a digital potentiometer 572 connected to the non-inverting input of the operational amplifier 568. The wiper and low terminal of the digital potentiometer 572 are connected to a ground potential. The position of the wiper of the digital potentiometer 572 is controlled by a connection 596 to a control computer interface (590 in FIG. 5). By varying the position of the wiper of the digital potentiometer 572, the phase shift through the phase shift circuit may be adjusted between 0° and 120°. The input signal 542 to the first phase shift circuit is from the variable gain amplifier (540 in FIG. 5). The output 574 of the first phase shift circuit is connected to the input of the second phase shift circuit. The output 576 of the second phase shift circuit is connected to the input of the third phase shift circuit. The output 562 of the third phase shift circuit is connected to a summing amplifier (580 in FIG. 5).

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method for injecting virtual flaw signals into a nondestructive test system, comprising the steps for:
   moving a test probe over a test piece by an inspector;
   providing an excitation signal from the nondestructive test system to the test probe and a virtual flaw injection circuit;
   determining virtual flaw parameter signals from test probe position signals and a stored virtual flaw map for the test piece;
   sending the virtual flaw parameter signals and an output signal from the test probe to the virtual flaw injection circuit;
   processing the excitation signal and the test probe output signal using the virtual flaw parameter signals for generating a virtual flaw response signal by the virtual flaw injection circuit;
   transmitting the virtual flaw response signal to a test probe input of the nondestructive test system; and
   displaying actual and virtual flaws to the inspector from the nondestructive test system.

2. The method of claim 1, wherein the step for determining virtual flaw parameter signals further comprises the steps for:
   reading the test probe position signals for indicating test probe positions relative to a test piece;
   reading test probe liftoff measurement signals for indicating test probe liftoff from the test piece;
   reading a virtual flaw map for the test piece stored in a memory for determining uncorrected virtual flaw parameter signals based on the test probe position signals; and
   applying a liftoff correction based on the test probe liftoff measurement signals to the uncorrected virtual flaw parameter signals for determining corrected virtual flaw parameter signals.

3. The method of claim 1, wherein the step for processing further comprises the steps for:
   modulating an amplitude of the excitation signal by the virtual flaw parameter signals;
   shifting a phase of the amplitude modulated excitation signal by the virtual flaw parameter signals; and
   summing the amplitude modulated and phase shifted excitation signal with the test probe output signal for generating a virtual flaw response signal by the virtual flaw injection circuit.

4. The method of claim 3, wherein the step for modulating an amplitude comprises modulating an amplitude of the excitation signal by virtual flaw gain parameter signals and the step for shifting a phase comprises shifting the phase of the excitation signal by virtual flaw phase shift parameter signals.

5. The method of claim 4, wherein the step for modulating the amplitude of the excitation signal comprises the steps for:
   connecting the excitation signal to the input of a variable gain amplifier;
   controlling the gain of the variable gain amplifier by the virtual flaw gain parameter signal; and
   providing an amplitude modulated excitation signal at the output of the variable gain amplifier.

6. The method of claim 4, wherein the step for shifting the phase of the amplitude modulated excitation signal comprises the steps for:
   connecting the amplitude modulated excitation signal to the input of a variable phase shifter;
   controlling the phase shift of the variable phase shifter by the virtual flaw phase shift parameter signal; and
   providing an amplitude modulated and phase shifted excitation signal at the output of the variable phase shifter.

7. The method of claim 1, further comprising the step for basing the nondestructive test system on eddy current technology.

8. A method for injecting virtual flaw signals into a nondestructive test system, comprising the steps for:
   connecting a flaw signal injection circuit between a nondestructive test instrument and a nondestructive test probe;
   receiving an excitation signal, a test probe output signal and virtual flaw parameter signals by the flaw signal injection circuit while moving a test probe over a test piece by an inspector;
   modulating an amplitude and shifting a phase of the excitation signal under control of the virtual flaw parameter signals in the flaw signal injection circuit;
   summing the amplitude modulated and phase shifted excitation signal with the test probe output signal for generating a virtual flaw response signal by the virtual flaw injection circuit; and
   sending the virtual flaw response signal from the virtual flaw injection circuit to a test probe input of the nondestructive test instrument for display of virtual and actual flaws to an inspector.

9. The method of claim 8, wherein the step for receiving virtual flaw parameter signals further comprises receiving virtual flaw parameters signals determined by the steps for:
   reading test probe position signals for indicating test probe positions relative to a test piece;
   reading test probe liftoff measurement signals for indicating test probe liftoff from the test piece;
   reading a virtual flaw map for the test piece stored in a memory for determining uncorrected virtual flaw parameter signals based on the test probe position signals; and
   applying liftoff correction based on the test probe liftoff measurement signals to the uncorrected virtual flaw parameter signals for determining corrected virtual flaw parameter signals.

10. The method of claim 8, wherein the step for modulating an amplitude comprises modulating an amplitude of the excitation signal by virtual flaw gain parameter signals and the step for shifting a phase comprises shifting the phase of the excitation signal by virtual flaw phase shift parameter signals.

11. The method of claim 10, wherein the step for modulating the amplitude of the excitation signal comprises the steps for:
   connecting the excitation signal to the input of a variable gain amplifier;
   controlling the gain of the variable gain amplifier by the virtual flaw gain parameter signal; and
   providing an amplitude modulated excitation signal at the output of the variable gain amplifier.

12. The method of claim 10, wherein the step for modulating the amplitude of the excitation signal comprises the steps for:

connecting the excitation signal to a high terminal of an input digital potentiometer;

connecting a wiper terminal of the input digital potentiometer to a noninverting input of a differential amplifier;

connecting a wiper terminal of a feedback digital potentiometer to an inverting input of the differential amplifier;

connecting an output of the differential amplifier to a high terminal of the feedback digital potentiometer;

connecting a low terminal of the input digital potentiometer and the feedback digital potentiometer to ground reference potential;

connecting the virtual flaw gain parameter signal to a control input of the input digital potentiometer and a control input of the feedback digital potentiometer; and providing an amplitude modulated excitation signal at the output of the differential amplifier.

13. The method of claim 10, wherein the step for shifting the phase of the amplitude modulated excitation signal comprises the steps for:

connecting the amplitude modulated excitation signal to the input of a variable phase shifter;

controlling the phase shift of the variable phase shifter by the virtual flaw phase shift parameter signal; and providing an amplitude modulated and phase shifted excitation signal at the output of the variable phase shifter.

14. The method of claim 10, wherein the step for shifting the phase of the amplitude modulated excitation signal comprises the steps for:

connecting three identical phase shift circuits in a cascade configuration, including the steps for:

connecting an input of a first phase shift circuit to the amplitude modulated excitation signal;

connecting an output of the first phase shift circuit to an input of a second phase shift circuit;

connecting an output of the second phase shift circuit to an input of a third phase shift circuit;

providing an output of the third phase shift circuit as the amplitude modulated and phase shifted excitation signal;

shifting the phase of a signal at an input of each phase shift circuit, including the steps for:

connecting the input signal of each phase shift circuit to a first terminal of an input resistor and a first terminal of an input capacitor;

connecting a second terminal of the input capacitor to a noninverting input of a differential amplifier and a high terminal of a digital potentiometer;

connecting a wiper terminal and a low terminal of the digital potentiometer to a ground reference potential;

connecting a second terminal of the input resistor to a first terminal of a feedback resistor and an inverting input of the differential amplifier;

connecting a second terminal of the feedback resistor to an output of the differential amplifier, the output of the differential amplifier providing an output of the phase shift circuit; and connecting the virtual flaw phase shift parameter signal to a control input of the input digital potentiometer for varying a phase shift of the phase shift circuit.

15. The method of claim 14, wherein the step for shifting the phase of a signal at an input of each phase shift circuit comprises shifting of the input signal between 0 and 120 degrees as represented by the phase shift circuit output signal.

16. The method of claim 8, further comprising the step for deriving the virtual flaw map from the group consisting of a model and premeasured flaws.

17. The method of claim 8, wherein the nondestructive test instrument and a nondestructive test probe are based on eddy current technology.

18. The method of claim 8, further comprising selecting a test probe from the group consisting of a single element probe, a dual element probe and a triple element probe.

19. A system for injecting virtual flaw signals into a nondestructive test system, comprising:

means for moving a test probe over a test piece by an inspector;

means for providing an excitation signal from the nondestructive test system to the test probe and a virtual flaw injection circuit;

means for determining virtual flaw parameter signals from probe test position signals and a stored virtual flaw map for the test piece;

means for sending the virtual flaw parameter signals and an output signal from the test probe to the virtual flaw injection circuit;

means for processing the excitation signal and the test probe output signal using the virtual flaw parameter signals for generating a virtual flaw response signal by the virtual flaw injection circuit;

means for transmitting the virtual flaw response signal to a test probe input of the nondestructive test system; and means for displaying actual and virtual flaws to the inspector from the nondestructive test system.

20. The system of claim 19, wherein the means for determining virtual flaw parameter signals further comprises:

means for reading test probe position signals for indicating test probe positions relative to a test piece;

means for reading test probe liftoff measurement signals for indicating test probe liftoff from the test piece;

means for reading a virtual flaw map for the test piece stored in a memory for determining uncorrected virtual flaw parameter signals based on the test probe position signals; and means for applying a liftoff correction based on the test probe liftoff measurement signals to the uncorrected virtual flaw parameter signals for determining corrected virtual flaw parameter signals.

21. The system of claim 19, wherein the means for processing further comprises:

means for modulating an amplitude of the excitation signal by the virtual flaw parameter signals;

means for shifting a phase of the amplitude modulated excitation signal by the virtual flaw parameter signals; and means for summing the amplitude modulated and phase shifted excitation signal with the test probe output signal for generating a virtual flaw response signal by the virtual flaw injection circuit.

22. The system of claim 21, wherein the means for modulating an amplitude comprises means for modulating an amplitude of the excitation signal by virtual flaw gain parameter signals and the means for shifting a phase comprises means for shifting the phase of the excitation signal by virtual flaw phase shift parameter signals.

23. The system of claim 22, wherein the means for modulating the amplitude of the excitation signal comprises:

means for connecting the excitation signal to the input of a variable gain amplifier;

means for controlling the gain of the variable gain amplifier by the virtual flaw gain parameter signal; and means for providing an amplitude modulated excitation signal at the output of the variable gain amplifier.

24. The system of claim 22, wherein the means for shifting the phase of the amplitude modulated excitation signal comprises the steps for:

the amplitude modulated excitation signal connected to the input of a variable phase shifter;

the phase shift of the variable phase shifter controlled by the virtual flaw phase shift parameter signal; and an amplitude modulated and phase shifted excitation signal provided at the output of the variable phase shifter.

25. The system of claim 19, further comprising the nondestructive test system based on eddy current technology.

26. A system for injecting virtual flaw signals into a nondestructive test system, comprising:

a flaw signal injection circuit connected between a nondestructive test instrument and a nondestructive test probe;

an excitation signal, a test probe output signal and virtual flaw parameter signals received by the flaw signal injection circuit while moving a test probe over a test piece by an operator;

an amplitude and a phase shift of the excitation signal being controlled by the virtual flaw parameter signals in the flaw signal injection circuit;

the amplitude modulated and phase shifted excitation signal being summed with the test probe output signal for generating a virtual flaw response signal by the virtual flaw injection circuit; and the virtual flaw response signal being sent from the virtual flaw injection circuit to a test probe input of the nondestructive test instrument for display of virtual and actual flaws to an inspector.

27. The system of claim 26, wherein the virtual flaw parameter signals further comprises virtual flaw parameters signals determined by:

test probe position signals for indicating test probe positions relative to a test piece;

test probe liftoff measurement signals for indicating test probe liftoff from the test piece;

a virtual flaw map for the test piece stored in a memory for determining uncorrected virtual flaw parameter signals based on the test probe position signals; and liftoff correction based on the test probe liftoff measurement signals to the uncorrected virtual flaw parameter signals for determining corrected virtual flaw parameter signals.

28. The system of claim 26, wherein the means for modulating an amplitude comprises means for modulating an amplitude of the excitation signal by virtual flaw gain parameter signals and the means for shifting a phase comprises means for shifting the phase of the excitation signal by virtual flaw phase shift parameter signals.

29. The system of claim 28, wherein the means for modulating the amplitude of the excitation signal comprises:

means for connecting the excitation signal to the input of a variable gain amplifier;

means for controlling the gain of the variable gain amplifier by the virtual flaw gain parameter signal; and means for providing an amplitude modulated excitation signal at the output of the variable gain amplifier.

30. The system of claim 28, wherein the means for modulating the amplitude of the excitation signal comprises:

the excitation signal connected to a high terminal of an input digital potentiometer;

a wiper terminal of the input digital potentiometer connected to a noninverting input of a differential amplifier;

a wiper terminal of a feedback digital potentiometer connected to an inverting input of the differential amplifier;

an output of the differential amplifier connected to a high terminal of the feedback digital potentiometer;

a low terminal of the input digital potentiometer and the feedback digital potentiometer connected to ground reference potential;

the virtual flaw gain parameter signal connected to a control input of the input digital potentiometer and a control input of the feedback digital potentiometer; and an amplitude modulated excitation signal provided at the output of the differential amplifier.

31. The system of claim 28, wherein the means for shifting the phase of the amplitude modulated excitation signal comprises the steps for:

the amplitude modulated excitation signal connected to the input of a variable phase shifter;

the phase shift of the variable phase shifter controlled by the virtual flaw phase shift parameter signal; and an amplitude modulated and phase shifted excitation signal provided at the output of the variable phase shifter.

32. The system of claim 28, wherein the means for shifting the phase of the amplitude modulated excitation signal comprises:

three identical phase shift circuits connected in a cascade configuration, including:

an input of a first phase shift circuit connected to the amplitude modulated excitation signal;

an output of the first phase shift circuit connected to an input of a second phase shift circuit;

an output of the second phase shift circuit connected to an input of a third phase shift circuit;

an output of the third phase shift circuit provided as the amplitude modulated and phase shifted excitation signal;

each phase shift circuit including:

the input signal of each phase shift circuit connected to a first terminal of an input resistor and a first terminal of an input capacitor;

a second terminal of the input capacitor connected to a noninverting input of a differential amplifier and a high terminal of a digital potentiometer;

a wiper terminal and a low terminal of the digital potentiometer connected to a ground reference potential;

a second terminal of the input resistor connected to a first terminal of a feedback resistor and an inverting input of the differential amplifier;

a second terminal of the feedback resistor connected to an output of the differential amplifier, the output of the differential amplifier providing an output of the phase shift circuit; and the virtual flaw phase shift parameter signal connected to a control input of the input digital potentiometer for varying a phase shift of the phase shift circuit.

33. The system of claim 32, wherein each phase shift circuit shifts the input signal between 0 and 120 degrees as represented by the phase shift circuit output signal.

34. The system of claim 26, further comprising the virtual flaw map derived from the group consisting of a model and premeasured flaws.

35. The system of claim 26, wherein the nondestructive test instrument and a nondestructive test probe are based on eddy current technology.

36. The system of claim 26, further comprising a test probe selected from the group consisting of a single element probe, a dual element probe and a triple element probe.

* * * * *